Aug. 3, 1965 H. W. WESTEREN ETAL 3,197,944
ROTARY ADSORBER HAVING INTERMITTENT MOVEMENT
Filed Aug. 7, 1961 4 Sheets-Sheet 1

INVENTORS.
Herbert W. Westeren
Carl G. Paulson
BY
Salter & Michaelson
Attorneys.

Aug. 3, 1965     H. W. WESTEREN ETAL     3,197,944
ROTARY ADSORBER HAVING INTERMITTENT MOVEMENT
Filed Aug. 7, 1961     4 Sheets-Sheet 2

INVENTORS.
Herbert W. Westeren
Carl G. Paulson
BY
Salter & Michaelson
Attorneys.

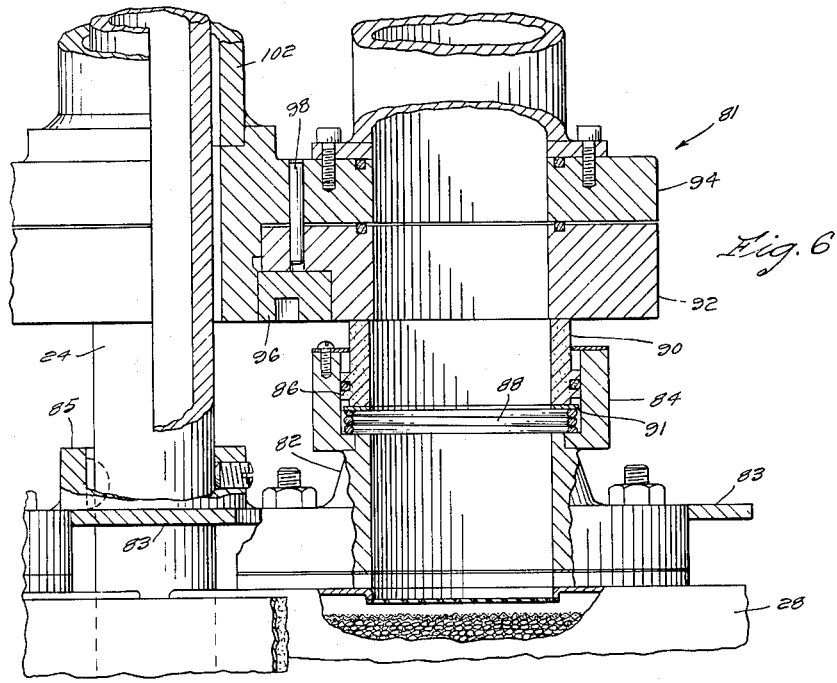
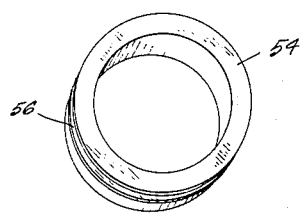
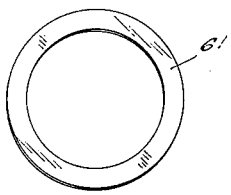
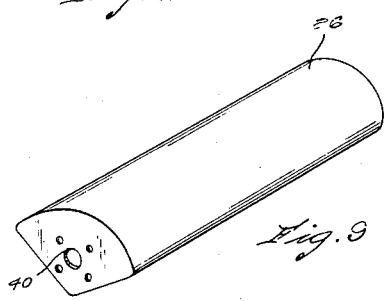

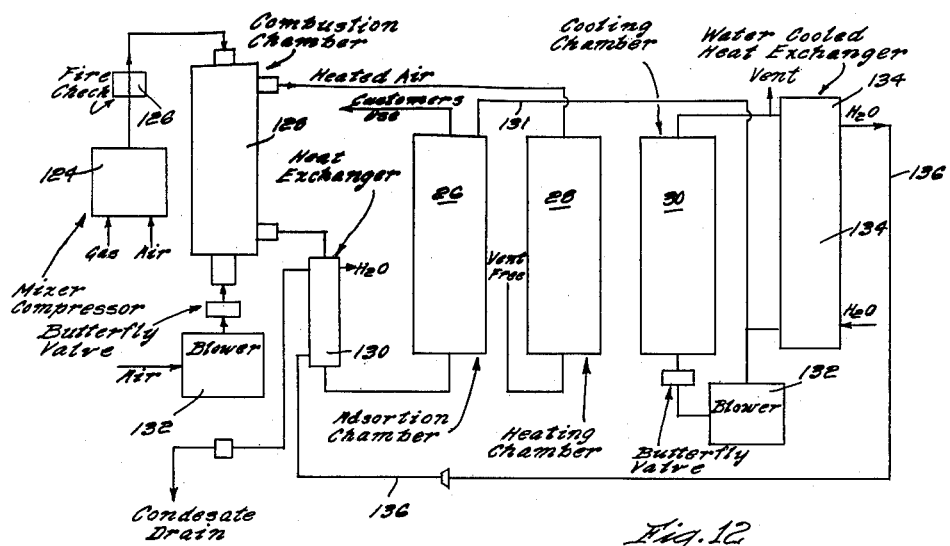
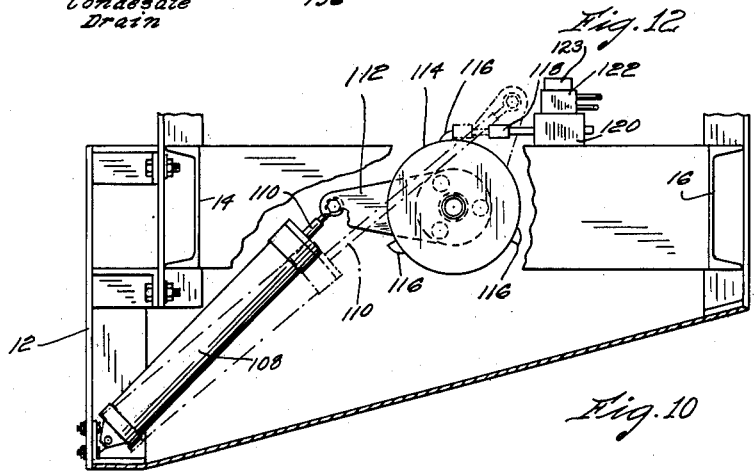
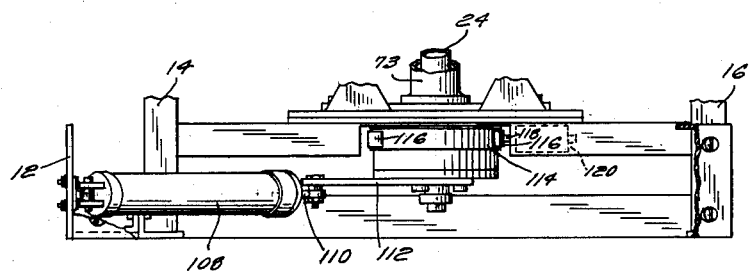

United States Patent Office 3,197,944
Patented Aug. 3, 1965

3,197,944
ROTARY ADSORBER HAVING INTERMITTENT MOVEMENT
Herbert W. Westeren, Barrington, and Carl G. Paulson, Providence, R.I., assignors to C. I. Hayes, Inc., Cranston, R.I., a corporation of Rhode Island
Filed Aug. 7, 1961, Ser. No. 129,705
1 Claim. (Cl. 55—162)

The present invention relates to apparatus for use in the separation of elements from a gas stream. More particularly, the present invention relates to a rotary manifold and a system for use therewith in the production of a treatment gas, wherein a plurality of operating chambers are successively moved to various stations during the operating cycle of the system.

The present invention has particular application in the use of adsorption equipment for use in the production of a treatment gas, such as nitrogen. The use of adsorption equipment in the production of a treatment gas is well known, and such equipment has been commercially available for many years. The problems encountered with such equipment during the operation thereof is the time and labor consumed when shutting down the system to remove the adsorption chamber that has become saturated in the operation thereof. Not only has it been necessary to place another adsorption chamber into operation at the treatment gas producing station, but the removed chamber must be regenerated, which procedure requires a two-step operation of first heating and then cooling the saturated drying agent located therein. Thus in the prior known treatment gas producing apparatus, three separate and distinct systems were required which included the piping and manifolding that had to be connected and disconnected to each adsorption chamber as it was moved to a particular station.

The present invention avoids the attendant difficulties inherent in the heretofore known systems utilizing adsorption chambers and includes a rotary manifold that has mounted thereon a plurality of adsorption chambers that are adapted to be selectively moved or indexed into alignment with fixed piping that comprise part of three separate systems necessary for the operation of the apparatus. By utilizing automatic timing devices, each of the three adsorption chambers may be automatically moved to the next station in the sequence of operation of the system and will be located in the proper position for the operation thereof without the requirement of shutting down the complete system or dismantling the piping to the various chambers.

Accordingly, it is an object of the present invention to provide a system for use with a plurality of adsorption chambers that are utilized in the production of a treatment gas, wherein the chambers are automatically and successively moved to the various stations during the operation of the system.

Another object of the invention is to provide a rotary manifold for use in the production of a treatment gas wherein a plurality of operating chambers are successively moved from one station to another at predetermined intervals.

Still another object is to provide a rotary system for use in adsorption apparatus wherein a plurality of adsorption chambers are located in a rotary manifold and are rotated about the axis of an operating shaft that is operatively connected thereto.

Still another object is to provide a rotary manifold in which a plurality of chambers are mounted therein, the chambers being sealed at the inlet and exhaust ends thereof by novel sealing assemblies.

Still another object is to provide sealing assemblies for use with adsorption apparatus that are adapted to compensate for expansion and contraction of the apparatus during the operation thereof.

Other objects, features and advantages of the invention will become apparent as the description thereof proceeds when considered in connection with the accompanying illustrative drawings.

In the drawings which illustrate the best mode presently contemplated by us for carrying out our invention:

FIG. 6 is an enlarged fragmentary sectional view of the upper end of one of the adsorption chambers showing the interrelation of the chamber to the operating shaft and the sealing assembly associated therewith;

FIG. 7 is a perspective view of one of the graphite sealing rings utilized in the upper and lower sealing assemblies;

FIG. 8 is a perspective view of one of the retaining rings utilized in the sealing assemblies;

FIG. 9 is a perspective view of one of the adsorption chambers;

FIG. 10 is a section taken through the base of the rotary manifold showing the structure for rotating the operating shaft;

FIG. 11 is an elevational view of the manifold rotating means illustrated in FIG. 10; and FIG. 12 is a diagrammatic illustration of the system in which the adsorption chambers are employed for producing a treatment gas.

The rotary manifold, embodied herein is adapted to be used particularly in the production of nitrogen. The production of nitrogen is carried out by the combustion of a natural gas or other fuel and then passing the combustion products into an adsorption chamber. The drying agent or desiccant located in the adsorption chamber removes the water vapor, other gas traces and carbon dioxide from the combustion products, leaving nitrogen that is then removed from the adsorption chamber from where it is directed to a station for use as a treatment atmosphere. Since the drying agent or desiccant in the adsorption chamber that is located at the operating station eventually becomes saturated and will no longer become effective in the removal of water and $CO_2$, the adsorption chamber must be removed from the operating station and regenerated. It is seen that in order to continue the production of the nitrogen, a regenerated adsorption chamber must be positioned at the operating station and connected to the necessary piping for receiving the combustion products from the combustion chamber.

The regenerating or reactivating cycle normally includes a heating cycle and a cooling cycle; however, the systems for carrying out the heating and cooling of the saturated adsorption chamber are independent, and therefore each is basically a separate system apart from the other. In effect, then, there are three systems utilized in the production of nitrogen as contemplated in the present invention. The first system includes an adsorption chamber located at an operating station which receives the combustible gases and removes the carbon dioxide, gas traces and water vapor therefrom for the production of nitrogen. The second system comprises part of the reactivation or regenerating cycle and is provided for heating and purging the drying agent or desiccant located in the adsorption chamber. The third system also comprises part of the regenerating cycle and provides for cooling the heated and purged adsorption chamber. The three systems that are incorporated in the present invention are operated simultaneously, and the adsorption chambers located at each station are adapted to be successively moved at predetermined intervals to the next operating station by a rotary manifold.

Figure 2:
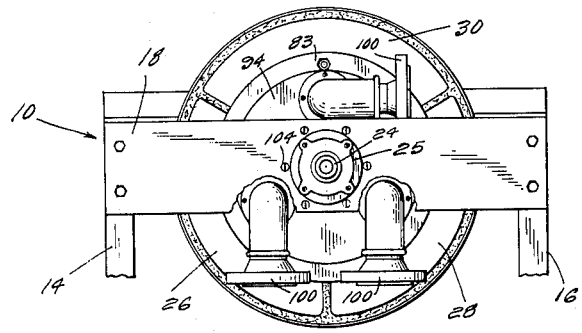
FIG. 2 is a top plan view of the rotary manifold illustrated in FIG. 1.
Figure 1:
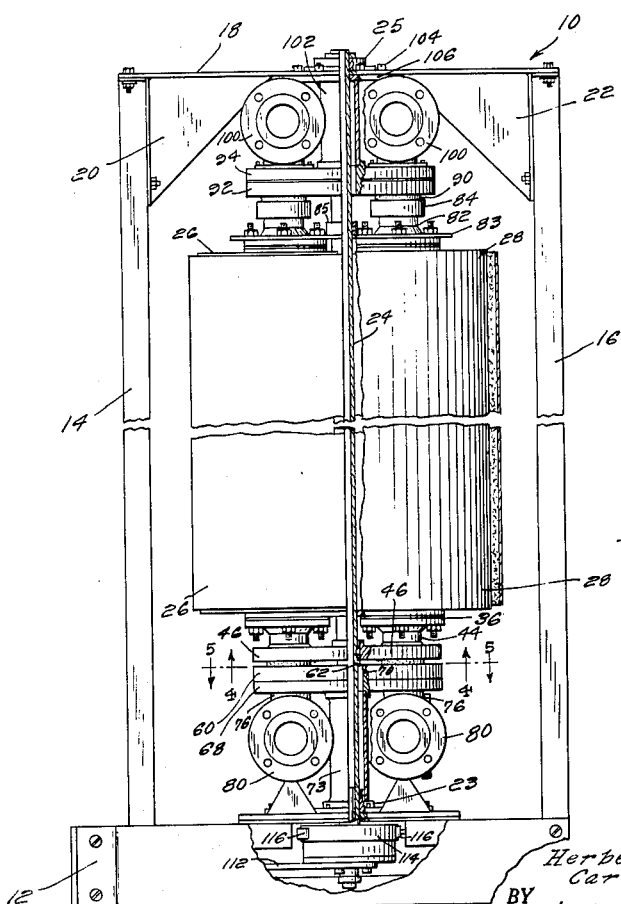
FIG. 1 is an elevational view with parts shown in section of the rotary manifold embodied in the present invention wherein a plurality of adsorption chambers are mounted for rotation therein.

Referring now to the drawings and particularly to FIGS. 1 and 2, the rotary manifold embodied in the present invention is illustrated and is generally indicated at 10. It is understood that the rotary manifold 10 includes the piping, seals and adsorption chambers that are adapted to be moved to the various stations during the operation of the apparatus. As shown in FIG. 1, the rotary manifold 10 includes a base 12 which has a frame mounted thereon consisting of side members 14 and 16 and a top plate 18 that is secured to the side members 14, 16. Upper brackets 20 and 22 interconnect the top plate 18 to the side members 14 and 16, respectively, so as to make the frame more rigid. Mounted for rotary movement in bearings 23 and 25 that are secured to the base 12 and top plate 18, respectively, is an operating shaft 24. The operating shaft 24 is located centrally of the rotary manifold 10, and, as will be described hereinafter, is adapted to be rotated at predetermined intervals to change the position of the operating chambers operatively connected thereto.

As shown in FIG. 2, the rotary manifold 10 has three adsorption or operating chambers 26, 28 and 30 mounted therein, all of which are identically formed and constructed. As shown in FIG. 9, each of the adsorption chambers has a configuration that in cross section is generally triangular. The outer surface of each chamber is arcuately formed so that the three chambers cooperate to define a cylindrical body, and it is understood that the adsorption or operating chambers are mounted in the rotary manifold 10 such that the longitudinal axes thereof are vertical. It is further understood that the interior construction of each of the adsorption chambers is the same, and a drying agent such as a desiccant is disposed therein to define a molecular sieve. Since the interior construction of the adsorption chambers is identical, each chamber may be moved to the operating chamber in successive order for carrying out the nitrogen producing operation.

Figure 3:
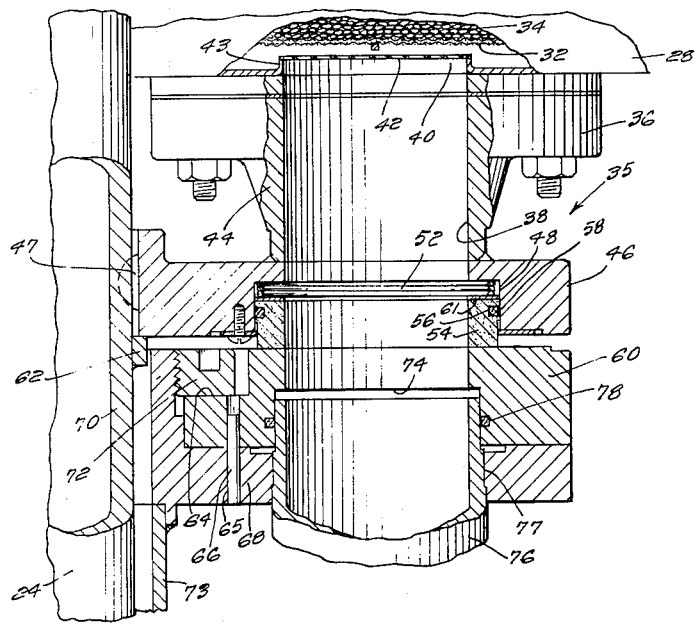
FIG. 3 is an enlarged fragmentary sectional view of the bottom end of one of the adsorption chambers showing the interrelation of the chamber to the operating shaft and the sealing assembly associated therewith.
Figure 4:
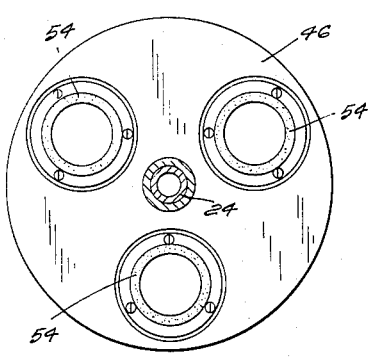
FIG. 4 is a sectional view taken along lines 4—4 in FIG. 1.
Figure 5:
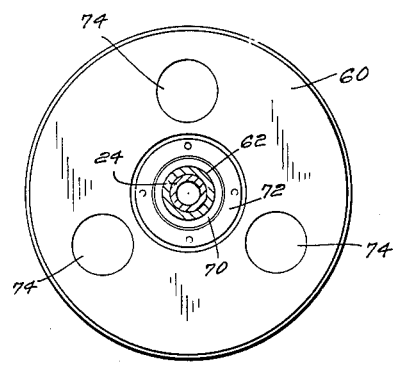
FIG. 5 is a sectional view taken along lines 5—5 in FIG. 1.

Each of the adsorption or operating chambers 26, 28, 30 is connected to the operating shaft 24 and is rotatable therewith about the axis of the shaft. By providing stationary piping for each system as will be described, the chambers are successively moved into communication therewith and depending upon the location will define with the piping one of the aforementioned systems. Referring to FIG. 3, the interconnection of one of the adsorption chambers to the shaft 24 is illustrated, and for purposes of this description adsorption chamber 28 will be described as the interconnected chamber. However, it is understood that all of the adsorption chambers are similarly interconnected to the shaft 24.

As illustrated in FIG. 3, the adsorption chamber 28 has a screen assembly 32 secured therein that retains the desiccant pellets indicated at 34 within the chamber in packed relation. The lowermost end of the chamber 28 is adapted to be secured to a sealing assembly generally indicated at 35 and for this purpose is formed with a flange 36 in which a central opening 38 is formed that communicates with an opening 40 located in the lower end of the chamber. A perforated plate 42 is mounted on annular raised edge 43 that is located within the chamber 28 adjacent the opening 40. Welded to a neck section 44 of the flange 36 is a rotary flange or plate 46 that is annular in construction and is secured to the shaft 24 by a key 47. Formed in the annular plate 46 are three equi-spaced circular sockets 48, against the innermost wall of which springs 52 are placed. Located within each of the sockets 48 is a graphite sealing ring 54, which as shown in FIG. 7 has an annular groove 56 formed in the outer surface thereof. An "O" ring 58 is located in the groove 56 of the graphite sealing ring 54 and effectively seals the graphite sealing ring within its socket 48. The outermost end of the graphite sealing ring 54 projects outwardly of the surface of the plate 46 and is adapted to be engaged by a mating ring 60 as will be described. A retaining ring 61 is located in each socket 48 and is interposed between the spring 52 and the inner surface of each graphite sealing ring 54.

In order to properly locate the plate 46, a thrust collar 62 is welded to the operating shaft 24 and receives the innermost edge of the plate 46 thereon. The mating ring 60 is fixed in position, as will be described, and is located in sealing relation in engagement with the graphite sealing ring 54. In order to positively locate the mating ring 60 in fixed position, an annular groove 64 is formed thereon adjacent the inner periphery thereof. A hole 65 is formed in the reduced section of the mating ring 60, that is defined by the groove 64, and receives a locating pin 66 therein, the locating pin 66 also extending through an opening formed in an annular flange 68. The flange 68 underlies the mating ring 60 and is formed with an upwardly extending central portion 70 that is threaded for threadably engaging a lock nut 72, the lock nut 72 being located in the groove 64 and locking the mating ring 60 to the flange 68. The flange 68 is mounted in fixed position by welding the underside of the inner periphery thereof to a vertically extending sleeve 73, only a portion of which is shown in FIG. 3. Three equally spaced stepped openings 74 are also formed in the mating ring 60, each of the openings 74 receiving a pipe 76 therein. The pipes 76 further extend through openings 77 formed in the flange 68 that are aligned with the openings 74. An "O" ring 78 is located in a groove in the wall of each opening 74 and acts to seal the pipe 76 within the mating ring 60. As shown more clearly in FIG. 1, each of the pipes 76 terminates in a flange 80 that is adapted to be bolted to suitable piping. It will be seen that upon rotation of the operating shaft 24 the plate 46 will be rotated therewith, thereby carrying the adsorption chamber 28 therewith together with the other adsorption chambers 26 and 30. Thus, it is seen that upon rotation of the operating shaft 24 the chambers will move about the axis of the shaft 24 therewith. During movement of the chambers about the shaft axis, the graphite sealing ring 54 slides on the mating ring 60, the mating surface of the ring 60 being chrome plated and lap hardened so as to form a relatively friction-free surface on which the graphite ring slides. The surface of the mating ring 60 that engages the graphite ring 54 also defines a seal therewith and prevents leakage of the operating gases from the system. The graphite sealing ring 54 is also responsive to movement of the adsorption chamber 28 when the chamber moves vertically in response to temperature changes, the sealing ring 54 being moved within its socket 48 against the action of the spring 52 to compensate for the expanding movement of the chamber.

The upper end of each of the chambers is also resiliently sealed to a fixed portion of the rotary manifold 10, the resilient sealing assembly being generally indicated at 81 and cooperating with the lower sealing assembly 35 to provide for expansion of each of the operating chambers. As shown in FIG. 6, the upper end of each of the operating chambers, as represented by chamber 28, includes a neck section 82 that is bolted to a plate 83 that is concentric with the circular configuration defined by the adsorption chambers and that is secured to the uppermost ends of the chambers. The plate 83 is further secured to the shaft 24 by a collar 85 and acts to transfer rotary movement of the shaft to the chambers. A fitting 84 is welded to the neck section 82 and is provided with an internal socket 86 in which a spring 88 is positioned. A graphite sealing ring 90 is disposed within the socket 86 and bears against a retaining ring 91 that engages the spring 88, the sealing ring 90 thereby being resiliently mounted within the fitting 84. Engaging the graphite sealing ring 90 in bearing relation so as to form a seal therewith is an annular mating ring 92 that is secured to a stationary annular flange 94 by means of a lock nut 96 and a locating pin 98. Both the mating ring 92 and the annular flange 94 are formed with spaced openings that communicate with each other and that further communicate with the graphite sealing ring 90, the sealing ring 90 providing for communication between the interior of the adsorption chamber 28 and a flange assembly 100. The stationary annular flange 94 is also secured to a sleeve 102 that surrounds the shaft 24 and is interconnected to the top plate 18 by means of bolts 104 and a plate 106.

In operation of the apparatus, the adsorption or operating chambers 26, 28, 30 are rotated with the shaft 24 about the axis thereof, thereby carrying their respective fittings 84 and graphite sealing rings 90 therewith. The graphite sealing rings 90 move with respect to the stationary annular mating ring with which they make sealing engagement. Inasmuch as each of the chambers 26, 28 and 30 is resiliently mounted in the upper and lower ends thereof, expansion and contraction thereof is compensated for by the springs 52 and 88. It will be noted that the upper sealing assembly 81 has a separate fitting 84 as contrasted with the lower sealing assembly 35 wherein the sealing rings 54 are located in sockets formed in the annular plate 46. This construction enables each of the chambers to individually expand, the amount of expansion being dependent upon the station at which the chamber is located.

As mentioned hereinabove, the adsorption chambers are adapted to be successively moved by the rotary manifold 10 from one station to another at predetermined intervals. For this purpose, an air cylinder 108 is provided and is pivotally mounted at the lowermost end of the rotary manifold within the base 12. A piston located within the air cylinder 108 has a piston rod 110 secured thereto, the piston rod 110 being pivotally connected to an operating arm 112 which in turn is connected to an electromagnetic coupling 114. The electromagnetic coupling 114 is suitably interconnected to the operating shaft 24 and is adapted to impart rotary movement thereto upon movement of the piston rod 110 within the cylinder 108. Since the adsorption chambers are adapted to be moved to a predetermined location in communication with the piping of the various systems, stops 116 are provided and are located on a rotary portion of the magnetic coupling. The stops 116 are equally spaced on the movable portion of the magnetic coupling and are adapted to be engaged by a movable piston 118. The air cylinder 120 controls the movement of the movable piston 118 and has a piston located therein. The movement of the air cylinder piston is controlled by a four-way valve 122 which has communication with the interior of the air cylinder 120. Since the four-way valve 122 is operated in timed relation with respect to the movement of the operating arm 112, operating air admitted under pressure to the cylinder 120 will cause the piston 118 to be moved to a position where it will engage one of the stops 116 so as to positively locate the shaft 24 in a predetermined position. This predetermined position will, of course, locate the adsorption chambers so that they are in communication with the piping of the three systems embodied in the complete operating cycle. The piston 118 and operating arm 112 are moved in timed relation so that the stops 116 will be correctly positioned for engaging the piston 118 thereby successively locating the various chambers at their respective stations so that the piping at each station makes proper communication with the chambers. For purposes of controlling the air cylinder 120, as required, a timing device indicated at 123 is provided and is operatively secured to the four-way valve 122 for controlling the operation thereof.

Referring now to FIG. 12, the operation of the apparatus will be described in connection with the system for producing the treatment gas, which in this instance is nitrogen. In order to produce nitrogen, a combustible fuel together with air is introduced into a combustion chamber where complete combustion takes place. For this purpose a mixer compressor 124 is provided and is adapted to receive a gas and air therein. The gas that is utilized may be natural gas or propane gas and is adapted to be mixed with predetermined quantities of air. The mixed gas and air is passed through a fire check 126 and into a combustion chamber 128. The mixture of gas and air is burned within the combustion chamber 128, and the resulting combustion products consisting of carbon dioxide, water vapor, other gas traces, and nitrogen are withdrawn from the bottom of the combustion chamber 128 into a heat exchanger 130. The combustible products are then introduced into the adsorption chamber located at the operating station, which for purposes of illustration is indicated as chamber 26. The drying agent or desiccant located in the adsorption chamber 26 withdraws the carbon dioxide, gas traces and water vapor from the gas stream, and the remaining nitrogen gas is then tapped off at the top of the chamber and directed to a station for use as desired.

After a predetermined period of time, the adsorption chamber 26 that is at the operating station, that is, that station that is adsorbing the $CO_2$ and water vapor, becomes saturated and must be reactivated or regenerated. As shown in FIG. 12, the chamber 28 is located at the heating station during the first stage of the regenerating cycle. At this station, the desiccant or drying agent located within the adsorption chamber 28 is heated and purged. For this purpose, air that is introduced into the combustion chamber by means of a blower 132 is withdrawn from the top of the combustion chamber in heated condition and is directed into the top of the chamber 28. The air which has been heated by the products of combustion purges and heats the chamber 28 and is then withdrawn from the bottom thereof for venting.

The second stage of the regenerating cycle is the cooling of the adsorption chamber, and as shown in FIG. 12, chamber 30 is located at the cooling station. In order to cool the heated drying agent within the chamber 30, a portion of the nitrogen is withdrawn from the chamber 26 through the line 131 and is introduced during the first portion of the cooling cycle into the upstream side of a blower 132. A portion of the cooling gas is vented prior to the introduction thereof into a heat exchanger 134. Water is continuously circulated through the heat exchanger 134 and is withdrawn through a line 136 which communicates with the heat exchanger 130 for circulating the water therethrough. The water is withdrawn from the heat exchanger 130 through an outlet, as indicated in FIG. 12. A portion of the cooling cycle also includes directing the nitrogen directly into the chamber 30 for venting as indicated.

Since each of the chambers 26, 28 and 30 must be successively moved to either the operating station, heating station or cooling station, all of the piping for each of these stations is stationary so that movement of the shaft 24 in the rotary manifold causes the chambers to be rotated about the axis of the shaft to the various stations. Thus, the three independent systems are simultaneously in operation, and the length of time each chamber is located at a particular station is dependent on the flow and size of the chambers. It is further seen that instead of complicated piping and valves which would be necessary if three separate systems were utilized, the present construction which utilizes the rotary manifold 10 provides for a relatively simple system. Thus, each chamber is selectively moved or indexed into alignment with the fixed piping for communication with one of the three systems as required.

In the description of the invention, the production of nitrogen as the treatment gas has been described, although it is understood that additional possibilities for the use of the invention are contemplated. For example, the three systems comprising the complete operating cycle in the present invention may be used where it is desired to dry or separate a gas by use of a molecular sieve such as defined by one of the operating chambers herein, and in this alternate use, the waste products of combustion would be vented and the air or gas to be dried would be fed from a separate source directly through one of the adsorption chambers. In this arrangement, the three systems would still be present and the rotary manifold as decsribed would be utilized with the concomitant advantages associated therewith.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claim.

What is claimed is:

In adsorption apparatus for the production of nitrogen, a frame, a shaft mounted for rotation on said frame, a rotary manifold that includes at least three separate but similarly constructed adsorption chambers vertically mounted in said frame in adjacent relation and operatively connected to said shaft for rotation therewith about the axis thereof, each of said adsorption chambers having an adsorbent material contained therein, said rotary manifold further including sealing assemblies located above and below each of said chambers and fixed thereto, additional piping located above and below said chambers and fixed in said frame, said additional piping cooperating with said chambers and the sealing assemblies fixed thereto to define an operating station, a heating station and a cooling station, means for directing a combustible gas into the chamber located at said operating station for the separation of nitrogen from said gas, means for heating the interior of the chamber located at the heating station for regenerating the adsorption material contained therein, means for cooling the interior of the adsorption chamber located at the cooling station for completing the regeneration cycle thereof, means for rotating said shaft to produce a corresponding rotation of said chambers for moving said chambers to said stations in successive order, means for interrupting the rotation of said shaft at selected intervals for locating said chambers at said stations for predetermined periods of time, said rotating means including an actuating device and an arresting device, and means for actuating said arresting device simultaneously with the operation of said actuating device for limiting the rotary movement of said shaft so that each of said chambers is advanced to the next station and retained thereat for the predetermined period of time.

References Cited by the Examiner

UNITED STATES PATENTS

| | | | |
|---|---|---|---|
| 1,602,500 | 10/26 | Nuss | 55—181 |
| 2,224,079 | 12/40 | Henry. | |
| 2,237,684 | 4/41 | Moore | 55—74 |
| 2,507,607 | 5/50 | Miller | 55—390 |
| 2,541,694 | 2/51 | Galson | 55—390 |
| 2,614,561 | 10/52 | Fox | 55—387 |
| 2,617,986 | 11/52 | Miller | 55—390 |
| 2,639,000 | 5/53 | Edwards | 55—390 |
| 2,894,542 | 7/59 | Alm | 73—421 |
| 2,921,970 | 1/60 | Gilmore | 55—75 |
| 2,975,860 | 3/61 | Westeren | 55—33 |
| 3,016,106 | 1/62 | Luft | 55—386 |

FOREIGN PATENTS 777,233  6/57  Great Britain.

OTHER REFERENCES

"Continuous Plant" article, in Chemical and Process Engineering 41 (7) page 290, July 1960.

REUBEN FRIEDMAN, *Primary Examiner.*

HERBERT L. MARTIN, *Examiner.*